United States Patent [19]

Barth

[11] Patent Number: 5,393,260

[45] Date of Patent: Feb. 28, 1995

[54] FLEXIBLE DOUBLE WALL VENT PIPE

[75] Inventor: James T. Barth, Plano, Tex.

[73] Assignee: Eljer Manufacturing, Inc., Dallas, Tex.

[21] Appl. No.: 166,238

[22] Filed: Dec. 10, 1993

[51] Int. Cl.⁶ .............................................. F23J 13/02
[52] U.S. Cl. ..................................... 454/44; 138/114; 138/122; 138/148
[58] Field of Search ............... 138/114, 121, 122, 148, 138/173; 285/133.1; 454/1, 44; 126/307 R

[56] References Cited

U.S. PATENT DOCUMENTS

| | | |
|---|---|---|
| 3,717,718 | 2/1973 | Schmidchen . |
| 3,730,073 | 5/1973 | Potter . |
| 3,730,229 | 5/1973 | D'Onofrio . |
| 3,740,930 | 6/1973 | Cullom . |
| 3,743,328 | 9/1975 | Longfellow . |
| 3,838,732 | 1/1987 | Overmyer . |
| 3,865,146 | 5/1987 | Meserole . |
| 3,970,334 | 11/1987 | Campbell . |
| 4,086,665 | 5/1978 | Poirier . |
| 4,121,623 | 10/1978 | Rhone . |
| 4,187,833 | 5/1979 | Zahora et al. . |
| 4,214,380 | 12/1979 | Meyer . |
| 4,259,990 | 4/1981 | Rohner . |
| 4,262,162 | 4/1981 | Plinke et al. . |
| 4,306,491 | 12/1981 | Reardon, Jr. . |
| 4,385,623 | 5/1983 | Jacklich . |
| 4,487,660 | 12/1984 | Netzel ...................... 138/114 X |
| 4,492,089 | 1/1985 | Rohner et al. . |
| 4,608,963 | 9/1986 | Townsend et al. . |
| 4,768,444 | 9/1988 | DeWerth et al. . |
| 4,846,147 | 7/1989 | Townsend et al. . |
| 4,852,616 | 8/1989 | Holcomb . |
| 4,966,202 | 10/1990 | Bryan et al. . |
| 5,020,512 | 6/1991 | Vago et al. . |
| 5,042,172 | 8/1991 | Foco et al. . |
| 5,165,732 | 11/1992 | Townsend . |

FOREIGN PATENT DOCUMENTS 70340 1/1912 Germany .
797229 6/1958 United Kingdom .

Primary Examiner—Harold Joyce
Attorney, Agent, or Firm—Wesley Noah; Catherine Bracken

[57] ABSTRACT

A double wall vent pipe is provided which comprises a first tubular wall that is helically corrugated to form radially outermost ridges spiraled around the outside of the first tubular wall and corresponding first recesses spiraled between the outermost ridges. The vent pipe also comprises a second tubular wall slidably disposed in a concentric relationship with the first tubular wall. The second tubular wall is helically corrugated to form radially innermost ridges which spiral around the inside of the second tubular wall and corresponding second recesses spiral between the innermost ridges. The radially innermost ridges are oriented in a direction oblique to the orientation of the radially outermost ridges such that a space between the first wall and the second wall will be maintained within the first recesses and the second recesses regardless of any bending of the vent pipe.

7 Claims, 1 Drawing Sheet

FLEXIBLE DOUBLE WALL VENT PIPE

TECHNICAL FIELD OF THE INVENTION

The present invention relates to a vent pipe for exhausting flue gases. In particular, the present invention relates to a vent pipe with two concentric tubular walls with spiraled corrugations to render the vent pipe flexible as well as insuring a space between the two walls regardless of bending of the vent pipe.

BACKGROUND OF THE INVENTION

The design of a vent pipe typically involves four competing parameters:
 a minimal wet time
 a maximum heat retention time
 minimal outer diameter
 flexibility
Often, the advantages of one or more of the above parameters must be sacrificed to achieve the advantages of the other parameters. For example, when flue gases are vented from an appliance through a vent pipe that remains at a temperature below the dew point of the flue gas, the flue gas will condense on the inside surface of the vent pipe. Because the flue gas contains acids, the condensation of the flue gas on the inside of the pipe deposits these acids and contributes to corrosion of the vent pipe. Therefore, it is desired that the inside of the vent pipe have a minimal wet time to help prevent condensation. Wet time is defined as the time for the inner surface of the vent pipe to reach a temperature exceeding the dew point of the flue gas. While a thin walled vent pipe will have a short wet time, a thin wall does not retain heat a sufficient amount of time and the vent pipe will cool down quickly which may result in excessive condensation. Thus, the advantages of a minimal wet time of a thin wall may be offset by the disadvantages of the minimal heat retention time of the thin wall.

As a further example, it is common for gas appliances to have a cycle time of about five minutes. This means that if the vent pipe does not reach a temperature above the dew point of the flue gas before five minutes, the appliance will have cycled off and the flue gas within the vent pipe will begin to condense on the inside of the vent pipe. However, even if the vent pipe does exceed the dew point temperature, it may then quickly cool back down after the appliance cycles off thus allowing condensation to occur. However, if the inside surface of the vent pipe reaches a temperature above the dew point of the flue gas before the appliance cycles off and the vent pipe remains at such a temperature for a sufficient time, the flue gas will exhaust while the vent pipe remains at a temperature above its dew point thereby preventing substantial condensation of the flue gas on the inside surface of the vent pipe.

Double wall vent pipes have been used in an attempt to utilize the air space between the two walls as a type of insulation to insure that the inside surface of the vent pipe heats up quickly and remains above the dew point of the flue gas. However, conventional double wall vent pipes typically have a larger outer diameter and are incapable of being readily bent or flexed to facilitate routing of the pipe through tight clearances. This rigid double wall pipe drives up the expenses of construction by requiring proper routing of the rigid double wall pipe from the flue gas source to an appropriate exhaust point. Further, if a double wall pipe is bent or flexed, the two walls may come in contact with each other and eliminate the space between the two walls and defeat the purpose of the double walls of the vent pipe.

While flexible single wall vent pipe has been used, such vent pipes do not have a sufficient heat retention time to prevent condensation on the inside surface of the vent pipe. Fibrous insulated double wall vent pipes are used; however, such vent pipes have a larger outer diameter which again drives up the cost of construction to insure proper clearances and routing space for the larger diameter pipe.

Thus, a need exists for a vent pipe which is sufficiently flexible to allow the use of the vent pipe in a wide variety of applications while at the same time being of such a structure that the temperature of its inside surface will be maintained above the dew point of the flue gas to prevent condensation within the vent pipe. In particular, there is a need for a vent pipe structured such that its inside surface has a minimal wet time, maximum heat retention time, minimal overall diameter and flexibility.

SUMMARY OF THE INVENTION

The present invention provides a flexible double wall vent pipe that is constructed such that the inside surface has a short wet time while the double walls provide a sufficient heat retention time to prevent condensation of flue gases on the inside surface. The flexibility and low overall thickness is achieved by helical corrugation. In one aspect, the present invention provides a method of venting flue gas from an appliance. First, the first end of a flexible double wall vent pipe of the present invention is placed in communication with the source of flue gas. The vent pipe comprises a first tubular wall that is helically corrugated to form radially outermost ridges spiraled around the outside of the first tubular wall and corresponding first recesses spiraled between the outermost ridges. The vent pipe also has a second tubular wall concentric with the first wall that is helically corrugated to form radially innermost ridges spiraled around the inside of the second tubular wall and corresponding second recesses spiraled between the innermost ridges. The radially innermost ridges are oriented obliquely with respect to the orientation of the radially outermost ridges such that a space between the first tubular wall and the second tubular wall is maintained within the first recesses and the second recesses regardless of any bending of the vent pipe. The next step is routing the vent pipe to locate the second end of the vent pipe in communication with a suitable exhaust point.

Another aspect of the present invention provides a vent pipe as described in the above method in which the first tubular wall has a thickness such that the first tubular wall will, when exposed to the flue gas, reach a temperature above the dew point of the flue gas within about five minutes.

By having the obliquely oriented corrugations on the two concentric tubular walls, the overall thickness of the vent pipe can be kept at a minimum while insuring that an air space exists between the two walls due to the recesses between the spiraled ridges. Because of the point contact between the outermost ridges and innermost ridges, heat lost by conduction between the two walls is negligible. Furthermore, the inside tubular wall can be constructed to a minimum thickness to insure a minimum wet time while at the same time the air space between the first and second wall insulates the first wall to insure that it remains at a sufficiently high temperature until the flue gas is exhausted. Furthermore, corrugations and minimal wall thicknesses allow the vent pipe of the present invention to be bent beyond 90° without detracting from the properties of the vent pipe.

DETAILED DESCRIPTION OF THE INVENTION

Figure 1:
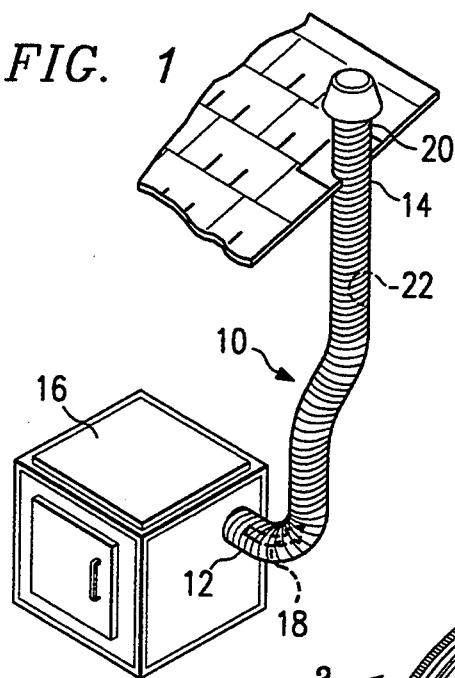
FIG. 1 is a schematic showing a vent system using the vent pipe of the present invention.

With reference to FIG. 1, an application is shown using the vent pipe of the present invention. Vent pipe 10 is shown having a first end 12 and second end 14. First end 12 of vent pipe 10 is connected to an appliance 16 which emits flue gas 18 represented by the arrow shown at first end 12. Second end 14 is connected to a suitable exhaust point 20. Appliance 16 may be of the type that cycles on and off. The "on" periods can typically be about five minutes or less. At the beginning of the cycle, flue gas 18 will enter vent pipe 10 which will cause inside surface 22 of vent pipe 10 to begin to heat up. As flue gas 18 continues to be emitted from appliance 16 and flows through vent pipe 10, the temperature of inside surface 22 of vent pipe 10 continues to rise. When appliance 16 stops emitting flue gas 18, the temperature of the inside surface 22 of vent pipe 10 will no longer appreciably rise because there is no new flue gas 18 entering vent pipe 10 to continue to heat inside surface 22. Vent pipe 10 of the present invention is constructed such that inside surface 22 will reach a temperature above the dew point of the flue gas before appliance 16 shuts down. A common period for such a cycle is about five minutes or less.

However, if inside surface 22 were to cool down to the dew point or lower before the last of the flue gas 18 has exited at the exhaust point 20, an unacceptable level of condensation of the flue gas may occur on inside surface 22. Therefore, vent pipe 10 of the present invention is constructed such that inside surface 22 remains at a temperature above the dew point of the flue gas a sufficient length of time to allow substantially all flue gas 18 to exit vent pipe 10.

Figure 2:
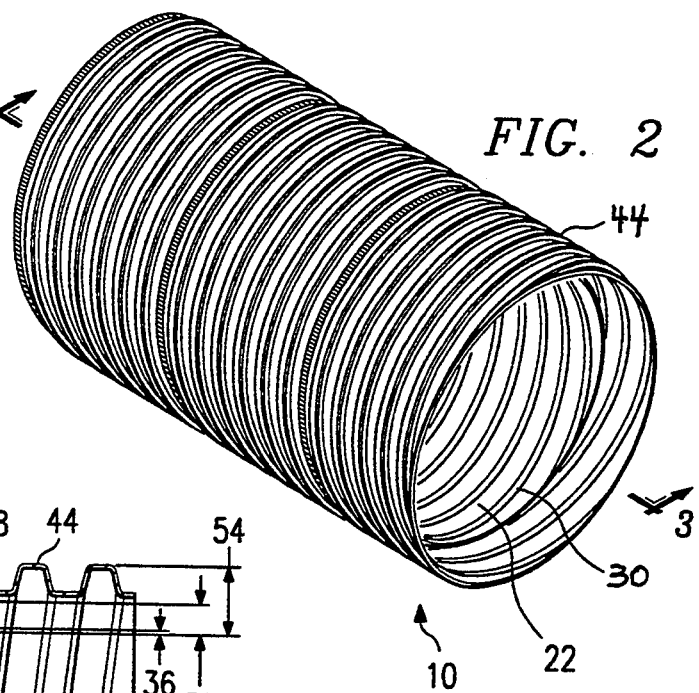
FIG. 2 is a perspective view of the vent pipe of the present invention.
Figure 3:
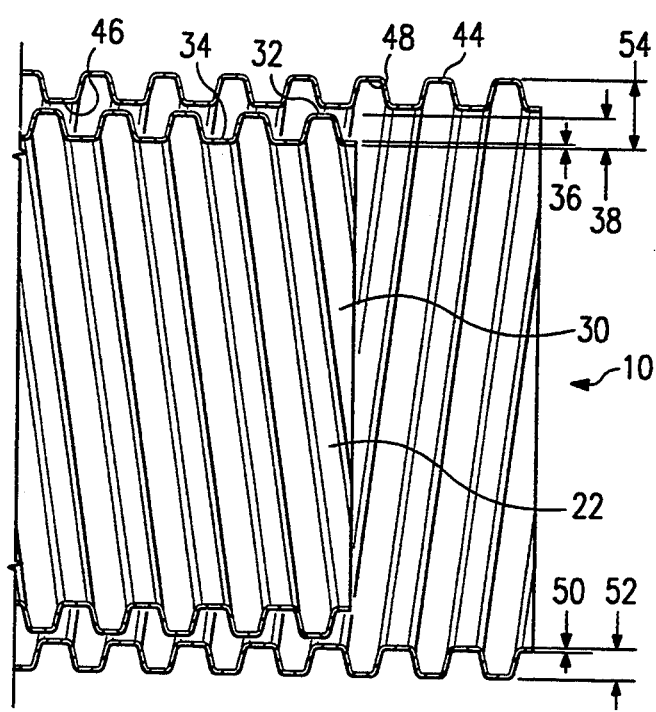
FIG. 3 is a cross section of FIG. 2 along line 3—3.

With reference to FIGS. 2 and 3, the construction of vent pipe 10 of the present invention can be seen. Vent pipe 10 comprises a first tubular wall 30. First tubular wall 30 is helically corrugated to form radially outermost ridges 32 spiraled around the outside of first wall 30. The helical corrugation also forms corresponding first recesses 34 which spiral around the outside of the first wall between the outermost ridges 32. First wall 30 also has inside surface 22 which is also convoluted in that it is the opposite side of radial outermost ridges 32 and first recesses 34. First tubular wall 30 has first thickness 36 which is the thickness of the material itself. First thickness 36 is generally constant. First tubular wall 30 also has second thickness 38 which is the distance from radial outermost ridges 32 to the radially innermost points on inside surface 22. In other words, second thickness 38 is a function of the height of radial outermost ridges 32 and the depth of first recesses 34.

Vent pipe 10 also comprises second tubular wall 44 which is slidably disposed over and concentric with first tubular wall 30. Second tubular wall 44 is helically corrugated to form radially innermost ridges 46 spiraled around the inside of the second tubular wall 44. The helical corrugation also forms corresponding second recesses 48 which are spiraled around the inside of second tubular wall 44 between innermost ridges 46. Second tubular wall has first thickness 50 and second thickness 52. Vent pipe 10 has overall thickness 54 from the radial innermost point of inside surface 22 to the radial outermost point of second tubular wall 44.

Radially innermost ridges 46 are oriented obliquely with respect to the orientation of radially outermost ridges 32. This oblique orientation of the innermost and outermost ridges insures that first recesses 34 and second recesses 48 will remain open to provide an air space around the outside of first tubular wall 30. If radial edges 32 and 46 were spiraled in a parallel orientation, then radial innermost ridges 46 may become disposed in first recesses 34 which would eliminate any space between first wall 30 and second wall 44. Therefore, in the present invention, radially innermost ridges 46 must be oriented obliquely to radially outermost ridges 32. In the preferred embodiment, radially innermost ridges 46 and radially outermost ridges 32 are spiraled in opposite directions. This insures that first recesses 34 and second recesses 48 will remain open. It should be understood that radially innermost ridges 46 and radially outermost ridges 32 could be spiraled in the same direction but at different angles to insure that first recesses 34 and second recesses 48 remain open.

In the preferred embodiment, first and second tubular walls 30 and 44 are made of aluminum. A three inch diameter vent pipe has an overall thickness 54 of about 0.281 inch, and each tubular wall has approximately the same first thickness of about 0.006 inch and second thickness of about 1.4 inches. Any combination of first thickness 36 and material of first tubular wall 30 such that inside surface 22 has a short wet time can be used. A short wet time is defined as a wet time less than a typical "on" cycle time period for the appliance with which the vent pipe is to be used, for example, five minutes, when non-extreme ambient temperatures are around the vent pipe. Obviously, if the vent pipe is routed through an uninsulated attic that is below freezing, the wet time will be longer. However, a short wet time can be achieved by thin walled metals, for example, aluminum.

Another aspect of the present invention is a method of venting flue gases from an appliance and comprises the first step of locating first end 12 of vent pipe 10 as described above in communication with the flue gas 18 emitting from appliance 16. Vent pipe 10 can then be routed around any obstructions due to the flexibility provided by the corrugations until second end 14 can be located at a suitable exhaust point. A suitable exhaust point may also include connections with other venting devices that ultimately exhaust the flue gas. With the flexibility of the present invention, routing the vent pipe is significantly easier and can be readily performed on site without extensive predesign of a routing path.

The preferred construction of vent pipe 10 of the present invention involves corrugating an aluminum strip lengthwise and then winding the strip about a longitudinal axis in a spiral fashion to create a continuous tubular wall. A seam is created along the edges of the aluminum strip to seal the tubular wall that is created by the spiraling of the strip. This construction of a single flexible corrugated vent pipe is known. The present invention takes two such pipes, one having a slightly smaller diameter than the other and one having a different orientation of corrugations than the other, and slidably disposes them in concentric relationship to each other. The outer diameter of the first tubular wall is preferably about 0.14 inch less than the inner diameter of the second tubular wall. The resulting double wall vent pipe is insulated as a result of the interposed air space between the two walls yet it is also extremely flexible with a minimal overall thickness as a result of the differently oriented corrugations.

Although a preferred embodiment of the present invention has been illustrated in the accompanying drawings and described in the foregoing Detailed Description, it will be understood that the invention is not limited to the embodiments disclosed, but is capable of numerous modifications, rearrangements and substitutions of parts and elements without departing from the scope of the invention as defined by the following claims.

I claim:

1. A method of venting flue gas from an appliance, comprising the steps of:

locating the first end of a double wall metal vent pipe in communication with the source of the flue gas, the vent pipe having a first tubular wall that is helically corrugated to form radially outermost ridges spiraled around the outside of the first tubular wall and corresponding first recesses spiraled between the outermost ridges, the vent pipe having a second tubular wall concentric with the first wall that is helically corrugated to form radially innermost ridges spiraled around the inside of the second tubular wall and corresponding second recesses spiraled between the innermost ridges, the radially innermost ridges being oriented obliquely with respect to the orientation of the radially outermost ridges such that a space between the first tubular wall and the second tubular wall will be maintained within the first recesses and the second recesses regardless of any bending of the vent pipe; and routing the vent pipe to locate the second end of the vent pipe in communication with a suitable exhaust point.

2. The method of claim 1 wherein the radially innermost ridges and the radially outermost ridges are spiraled in opposite directions.

3. The method of claim 1 wherein the first tubular wall has an inside surface and the first tubular wall has a thickness such that the inside surface, when exposed to the flue gas, can reach a temperature above the dew point of the flue gas within about five minutes.

4. The method of claim 3 wherein the space between the first tubular wall and the second tubular wall in conjunction with the thickness of the second tubular wall are such to operably insulate the first tubular wall.

5. A vent pipe adapted for exhausting flue gas, comprising:

a first tubular wall that is helically corrugated to form radially outermost ridges spiraled around the outside of the first tubular wall and corresponding first recesses spiraled between the outermost ridges;

a second tubular wall concentric with the first wall that is helically corrugated to form radially innermost ridges spiraled around the inside of the second tubular wall and corresponding second recesses spiraled between the innermost ridges;

the radially innermost ridges being spiraled in a direction oblique to the orientation of the radially outermost ridges such that a space between the first tubular wall and the second tubular wall will be maintained within the first recesses and the second recesses regardless of any bending of the vent pipe; and the first tubular wall having a thickness and of a material such that the first tubular wall has a short wet time.

6. The method of claim 5 wherein the radially innermost ridges and the radially outermost ridges are spiraled in opposite directions.

7. The method of claim 5 wherein the space between the first tubular wall and the second tubular wall in conjunction with the thickness of the second tubular wall are such to operably insulate the first tubular wall.

* * * * *